United States Patent
Karkowski et al.

(10) Patent No.: US 9,396,403 B2
(45) Date of Patent: Jul. 19, 2016

(54) METHOD OF VEHICLE IDENTIFICATION AND A SYSTEM FOR VEHICLE IDENTIFICATION

(71) Applicant: Instytut Badawczy Drog i Mostow, Warsaw (PL)

(72) Inventors: Michal Karkowski, Legionowo (PL); Tadeusz Dzienis, Warsaw (PL); Cezary Dolega, Wroclaw (PL); Pawel Mrowka, Wroclaw (PL)

(73) Assignee: Instytut Badawczy Drog i Mostow, Warszawa (PL)

( * ) Notice: Subject to any disclaimer, the term of this patent is extended or adjusted under 35 U.S.C. 154(b) by 0 days.

(21) Appl. No.: 14/359,306

(22) PCT Filed: Dec. 31, 2012

(86) PCT No.: PCT/EP2012/077109
§ 371 (c)(1),
(2) Date: May 20, 2014

(87) PCT Pub. No.: WO2014/101970
PCT Pub. Date: Jul. 3, 2014

(65) Prior Publication Data
US 2015/0294174 A1    Oct. 15, 2015

(51) Int. Cl.
*G06K 9/18*    (2006.01)
*G06K 9/32*    (2006.01)
(Continued)

(52) U.S. Cl.
CPC ............ *G06K 9/18* (2013.01); *G06F 17/30256* (2013.01); *G06K 9/325* (2013.01);
(Continued)

(58) Field of Classification Search
CPC ................... G06F 17/30256; G06K 2209/15; G06T 2207/3052
See application file for complete search history.

(56) References Cited

U.S. PATENT DOCUMENTS

| 5,591,975 A * | 1/1997 | Jack ................... G01N 21/3504 250/338.5 |
| 7,982,634 B2 * | 7/2011 | Arrighetti ............ G06K 9/3258 340/928 |

(Continued)

OTHER PUBLICATIONS

Greg Pearce et all "Automatic Make and Model Recognition from Frontal Images of Cars";published in Advanced Video and Signal-Based Surveillance (AVSS), 2011 8th IEEE International Conference on , Aug. 30, 2011-Sep. 2, 2011 pp. 373-378.

(Continued)

*Primary Examiner* — Gregory M Desire
(74) *Attorney, Agent, or Firm* — Mark M. Friedman

(57) ABSTRACT

A method for vehicle identification to determine at least one vehicle characteristic, comprising: obtaining an input image (301) of the vehicle from an image source (101); normalization of the input image (301) of the vehicle in a normalization unit (103, 104) to obtain a normalized image; determining the vehicle characteristic in a classification unit (111, 112) by comparing parameters of a normalized image obtained in a parametrization unit (107, 108) with parameters of reference images obtained from a reference database (113, 114). Normalization in the normalization unit (103, 104) comprises the steps of: detecting a registration plate area (303) within the input image (301); processing the input image (301) basing on normalization attributes defining at least one scaling coefficient ($z_{norm}$, $a_{norm}$, $v_{norm}$); choosing from the scaled image (307) a RoI area (308) of a normalized size and location dependent on the location of the registration plate area (303); and presenting data from the RoI area (308) as a normalized image (311).

10 Claims, 8 Drawing Sheets

(51) Int. Cl.
*G06F 17/30* (2006.01)
*G06K 9/62* (2006.01)
*G06T 1/00* (2006.01)
*G06T 3/40* (2006.01)
*G06T 3/60* (2006.01)
*G06T 7/00* (2006.01)

(52) U.S. Cl.
CPC ........... *G06K 9/6212* (2013.01); *G06T 1/0007* (2013.01); *G06T 3/40* (2013.01); *G06T 3/60* (2013.01); *G06T 7/0081* (2013.01); *G06K 2009/6213* (2013.01); *G06K 2209/15* (2013.01); *G06T 2207/10004* (2013.01); *G06T 2207/10016* (2013.01); *G06T 2207/10024* (2013.01); *G06T 2207/30252* (2013.01)

(56) References Cited

U.S. PATENT DOCUMENTS

| | | | | |
|---|---|---|---|---|
| 8,212,812 | B2 * | 7/2012 | Tsin | G06F 17/5095 345/420 |
| 8,620,026 | B2 * | 12/2013 | Datta | G06K 9/00751 382/103 |
| 8,971,581 | B2 * | 3/2015 | Wu | G06K 9/00785 340/932.2 |
| 2011/0044536 | A1 * | 2/2011 | Cobb | G06K 9/46 382/165 |
| 2012/0275653 | A1 * | 11/2012 | Hsieh | G06K 9/325 382/105 |
| 2013/0208121 | A1 * | 8/2013 | Wu | G08G 1/0175 348/149 |
| 2014/0056520 | A1 * | 2/2014 | Rodriguez Serrano | G06K 9/325 382/174 |
| 2015/0294174 | A1 * | 10/2015 | Karkowski | G06K 9/325 382/182 |

OTHER PUBLICATIONS

Louka Dlagnekov et al, "Recognizing Cars",XP-002699263, published in the web in http://staff.science.uva.nl/~rein/UvAwiki/uploads/HVisser/Recognizing_Cars_Dlagnekov_Belongie.pdf.

Zafae E.A.Edirinsghe et all: Two Dimensional Statistical Linear Discriminant Analysis for Real-Time Robust Vehicle Type Recognition; in Real time Image Processing 2007 edited by Nasser Kehtamavaz et all. It is XP-002699264.

A.Psyllos et all: "Vehicle model recognition from frontal view image measurements" in Computer Standards & Interfaces, vol. 33, Issue 2, pp. 115-206 (Feb. 2011).

Xavier Clady et all Multi-Class Vehicle Type Recognition System published ;www.researchgate.net/...Multi-class_Vehicle_Type_Recognition_System/.../ e0b4952a59ec8b3c12.pdf.

Michal Conos "Recognition of Vehicle Make from a Frontal View" Oct. 14, 2007 published in the web in "vellum.cz/~mikc/oss-projects/CarRecognition/doc/dp.pdf".

Hua Huang et all"A 2DLDA Based Algorithm for Real Time Vehicle Type Recognition" Published in: Intelligent Transportation Systems, 2008. ITSC 2008. 11th International IEEE Conference on , Date of Conference: Oct. 12-15, 2008 pp. 298-303.

* cited by examiner

METHOD OF VEHICLE IDENTIFICATION AND A SYSTEM FOR VEHICLE IDENTIFICATION

TECHNICAL FIELD

The present invention relates to vehicle identification for determining vehicle characteristics, such as body style, make or colour.

BACKGROUND ART

Various types of identification systems for determining vehicle characteristics for statistical purposes are known, for example for determining types of vehicles participating in traffic in given measuring point or searching for specific vehicles. The efficiency of such systems depends on quality and type of input data, data processing algorithms and quality of reference data. The effectiveness of typical systems amounts to 90%, which is an unsatisfactory value, as it leaves a large part of vehicles unrecognised, and these vehicles have to be classified manually. This involves high costs of classification and extends its duration.

The international patent application WO 2004/042673 discloses a method for automatic, real-time vehicle identification, in which a video, presenting objects moving in specified field of view, is obtained. Models of cars are defined in a car model database CMDB by characteristic geometric features, described by a mathematical model, which are compared with data from obtained video frames converted to mathematical models. Processed images are normalised, i.e. rotated and scaled, depending on data, which describe rotation angle of the data-supplying device and its distance from vehicles to identify. Such solution is difficult to implement on a larger scale, as it requires individual adjustment for specific data-supplying device. Moreover, it does not take into account image deformations resulting from device wear-out.

The aim of the invention is to provide a system and a method for vehicle identification, which allows to identify characteristics of a vehicle automatically and in real-time, assuring high effectiveness of identification and allowing the analysis of images of vehicles obtained in different conditions and from various image sources.

DISCLOSURE OF THE INVENTION

The object of the invention is a method for vehicle identification to determine at least one vehicle characteristic, comprising: obtaining an input image of the vehicle from an image source; normalisation of the input image of the vehicle in a normalisation unit to obtain a normalized image; determining the vehicle characteristic in a classification unit by comparing parameters of a normalised image obtained in a parametrisation unit with parameters of reference images obtained from a reference database. The method is characterised in that normalisation in the normalisation unit comprises the steps of: detecting a registration plate area within the input image; processing the input image basing on normalisation attributes defining at least one scaling coefficient ($z_{norm}$, $a_{norm}$, $v_{norm}$), choosing from the scaled image a RoI area of a normalised size and location dependent on the location of the registration plate area; and presenting data from the RoI area as a normalised image.

Preferably, for a specific input image scene the following steps are performed: obtaining a set of reference images; selecting values of normalisation attributes defining at least one scale coefficient ($z_{norm}$, $a_{norm}$, $v_{norm}$) in a manner allowing to obtain the scaled image with the registration plate of the normalised size ($w_{plate}$, $h_{plate}$) as a result of processing during normalisation, for most of the reference images; setting said selected values of normalisation attributes ($z_{norm}$, $a_{norm}$, $v_{norm}$) to perform normalisation of subsequent input images obtained in given scene.

Preferably, the method is characterized by further comprising selecting a value of a normalisation attribute determining angular rotation of image ($\alpha_{norm}$), in a manner allowing to obtain a rotated image with a registration plate of a lower border positioned at a normalised angle as a result of processing during normalisation, for most of the reference images.

Preferably, processing of input image during the normalisation results in colour reduction of input image.

Preferably, processing of input image during the normalisation results in decimation of input image.

Preferably, within the RoI area, presented as the normalised image, the field comprising the registration plate and/or the field comprising the area from beyond input image are presented as undefined data.

Preferably, the method is characterised by performing contrast adjustment within the RoI area, presented as the normalised image.

Preferably, the normalisation attributes are dependent on the vehicle characteristic to be determined based on normalised image.

Preferably, parameters of normalised image to determine the body style, make and/or model of the vehicle are presented as a vector ($c^{(nI)}_{l,n,s}$) which is a function of at least one oriented gradient of brightness change of the normalised image.

Preferably, the parameters of the normalised image to determine colour of the vehicle are presented as an occurrence frequency histogram of normalised colours in receptive fields of normalised image.

The object of the invention is also a system for vehicle identification to determine at least one vehicle characteristic, comprising: an image source providing an input image of the vehicle; a normalisation unit configured to normalize of the input image of the vehicle to obtain a normalized image; a classification unit configured to determine the vehicle characteristic by comparing parameters of a normalised image obtained in a parametrisation unit with parameters of reference images obtained from a reference database. The system is characterised in that the normalisation unit is configured to operate by: detecting a registration plate area within the input image; processing the input image basing on normalisation attributes defining at least one scaling coefficient ($z_{norm}$, $a_{norm}$, $v_{norm}$); choosing from the scaled image a RoI area of a normalised size and location dependent on the location of the registration plate area; and presenting data from the RoI area as a normalised image.

BRIEF DESCRIPTION OF DRAWINGS

The object of invention is presented in exemplary embodiments on a drawing, in which.

MODES FOR CARRYING OUT THE INVENTION

Figure 1:
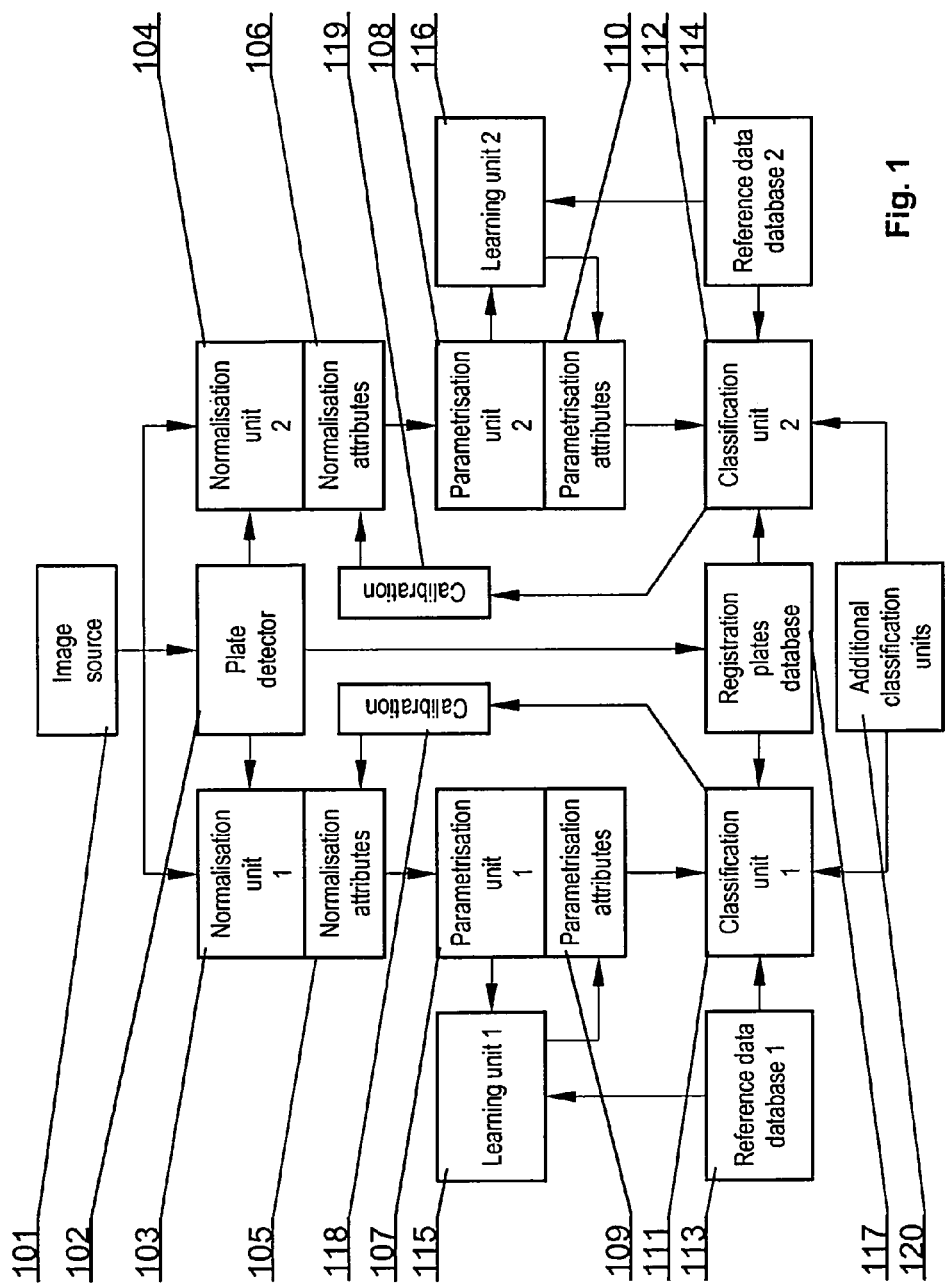
FIG. 1 illustrates the structure of the system according to the invention.

FIG. 1 illustrates the structure of the system according to the invention. Image source 101 supplies input images 301 of vehicles 302 from an observation point. The image source 101 can be a street video camera streaming live signal or a photo camera sending images of vehicles taken after triggering the camera by a motion sensor. The image source 101 can also be a reference database, used to calibrate the attributes or for system learning. Images are transferred to registration plate recognising module 102, which determines the location of the registration plate within the image. The registration plate recognising module 102 can also recognise a registration number written on the registration plate. Characteristics of the registration plate are fed to at least one normalisation unit 103, 104. If the system is to recognise many characteristics of a vehicle, for each characteristic there can be adapted an individual route of recognising, comprising normalisation, parameterisation and classification units, operation of which is adapted for recognising specified characteristic. Normalisation units 103, 104 receive an input image from an image source 101 and process it according to the normalisation attributes 105, 106 defined separately for each unit 103, 104 to minimise the influence of distortion caused by variable exposure conditions and different scene properties (for instance arrangement of the camera with respect to moving vehicles) for different locations of camera, as well as to select RoI (Region of Interest) for parameterisation. For example, normalisation attributes 105 for normalisation unit 103 can be adjusted to determine body style, make and model of a vehicle, and normalisation attributes 106 for normalisation unit 104 can be adjusted to determine colour of a vehicle. The normalisation process has been described with details in FIG. 2. Normalised images are sent to parameterisation units 107, 108, which process them according to parameterisation attributes 109, 110 defined separately for each unit 107, 108. The task of the parameterisation units 107, 108 is to calculate the value of parameters characterising normalised image, for instance by reduction of dimensionality of an image and by improving image differentiating abilities, in order to emphasise features belonging to different classes, and to reduce features common for many classes. The parameterisation units 107, 108 send values of parameters to classification units 111, 112, in which they are compared with values of reference parameters stored in a reference database 113, 114 separately for each characteristic, to determine given characteristic of a vehicle. In the exemplary embodiment, the units 103, 105, 107, 109, 111, 113 can be responsible for recognising the body style, make and model of a vehicle, and the units 104, 106, 108, 110, 112, 114 can be responsible for recognising the colour of a vehicle. Moreover, the system also comprises learning units 115, 116 for analysis of newly processed images and corresponding adjustment of parameterisation attributes 109, 110.

The reference databases 113, 114 contain ordered sets of vehicle images, captured in selected locations and in selected exposure conditions, for which images a description is added, including manually verified information about scene location, body style, make, model and colour of a vehicle. The databases can contain separate sets of images: a learning set, a checking set, a testing set. The learning set can contain for example about 60% of all vehicles, the checking set about 20% of all vehicles, and both of these sets are used in system learning process. The testing set can contain about 20% of all vehicles and can be used to test the quality of operation of the system. Each vehicle in the database can be represented by an image file comprising the image and a data file, for example an XML file, describing manually defined and verified information about scene location, body style, make, model and colour of a vehicle. In case of classification of body style, make and model of a vehicle, some vehicles can have defined just the body style and make, and other vehicles can have defined just the body style. Reference data should be selected in a manner allowing them to be representative for the variance of exposure conditions and scene parameters, occurring in expected operating conditions.

Moreover, if the system is equipped with a registration plate detector 102, which reads descriptions on the plate, then this system can cooperate with registration plates database 117, in which characteristics of vehicle of said registration numbers are stored. In such a case the classification units 111, 112 can compare the identified characteristic with the characteristic stored in registration plates database 117 for a vehicle of given registration numbers, which allows further verification of recognised vehicle characteristics. Disparity of characteristics can indicate that the characteristic has been identified incorrectly, or that the vehicle registration plate in the input image is not the plate assigned to the vehicle of these characteristics.

The classification units 111, 112 can cooperate also with additional classification units 120, for example with automatic vehicle weighing system determining vehicle length and for each axle load and distance from the former axle. Based on this data, vehicle characteristics can be determined, for comparing with the characteristics determined in classification units 111, 112, to increase the probability of correct classification.

Figure 2:
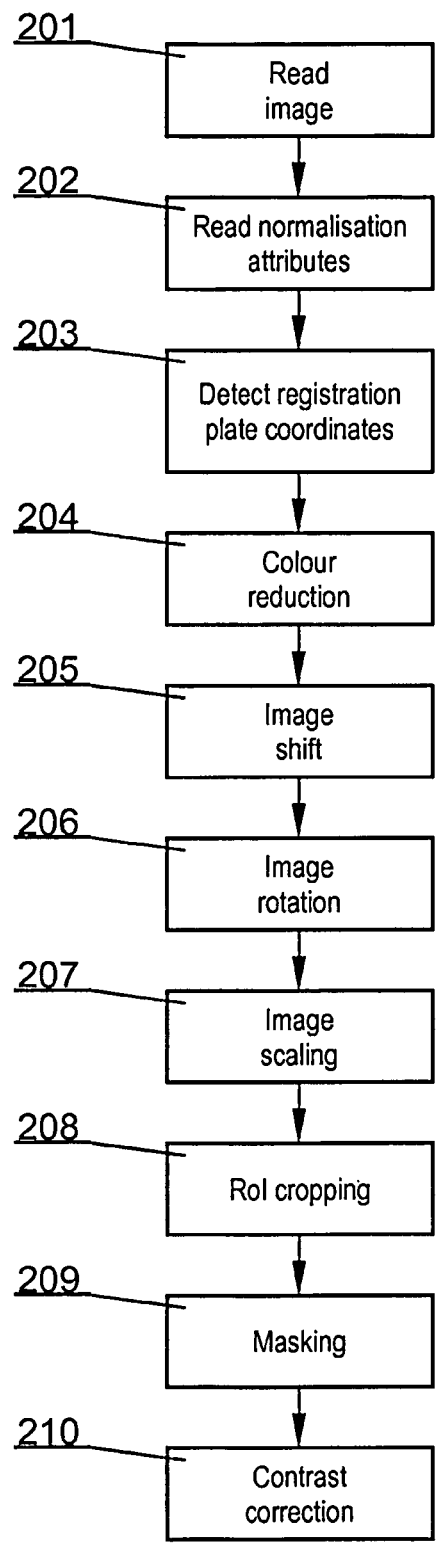
FIG. 2 illustrates an example of normalisation process for determining body style, make and model of a vehicle.

FIG. 2 illustrates exemplary normalisation process for determining body style, make and model of a vehicle, performed by the normalisation unit 103, and FIG. 3A-3F illustrate exemplary content of images processed during this process.

Figure 3A:
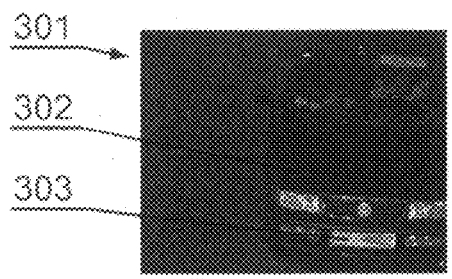
FIG. 3A-3F illustrates exemplary images processed during the normalisation process for determining body style, make and model of a vehicle.

In the first step 201 an input image 301 with a vehicle 302 is read from an image source 101. An exemplary input image 301 is shown in FIG. 3A. Next, in step 202, image normalisation attributes are read, for example:

an image rotation angle $\alpha_{norm}$, which can for example be equal to 2.75 deg;

a scale coefficient $z_{norm}$, which can for example be equal to 0.7544;

an anisotropy coefficient $\alpha_{norm}$, which can for example be equal to 1.0;

a perspective scale coefficient $v_{norm}$, compensating scale changes of the image related to perspective projection, which can for example be equal to 0.2456;

RoI area coordinates, for example determining central image area of 600×300 pixels dimensions;

attributes for calculating the contrast of the image.

The normalization attributes can be selected individually for each scene (i.e. specific setting of specific camera) by the unit 118 for calibration of normalisation attributes. The calibration can be performed based on a set of reference images containing input images of vehicles from a given scene, with known characteristics (for example body style, make, model) determined manually beforehand. For reference images the initial values of the attributes can be defined manually, for example in the following way:

the image rotation angle should be selected according to the setting of the parameters of the lens of the image source so that after the rotation of input image 301 by a given angle a lower border 304 of a registration plate was positioned at normalised angle, preferably horizontally;

the scale coefficient $z_{norm}$ should be selected so that in most cases the width of the registration plates 303 appearing in the middle of the image height after the rotation (FIG. 3C) was equal to normalised plate width defined by $w_{plate}$;

anisotropy coefficient $a_{norm}$ should be selected so that in most cases the height of the registration plate 303 appearing in the middle of the image height after the rotation (FIG. 3C) was equal to normalised plate height defined by $h_{plate}$;

the perspective scale coefficient $v_{norm}$ should be selected so that in most cases the dimensions of the registration plates appearing in the distance from the centre of the image after the rotation (i.e. plates of other cars) were equal to the dimensions of the registration plates 303 appearing in the centre of the image after the rotation (FIG. 3).

The attribute values selected initially may then be adjusted to maximize classification quality based on the given set of reference images, by performing the classification for the images from the set with different combinations of attribute values and by determining the combination, which provides the best accuracy of the classification.

Figure 3B:
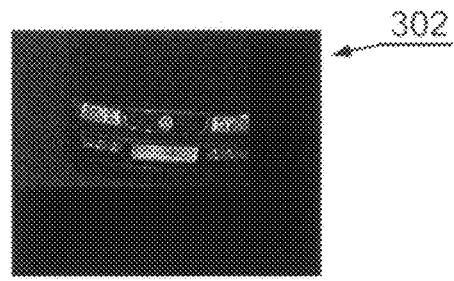
Figure 3C:
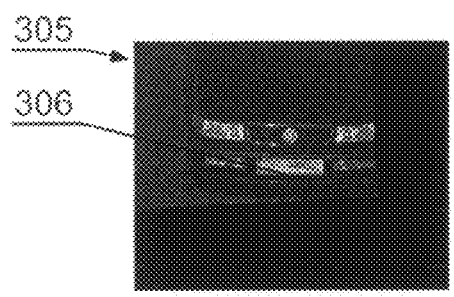

In the following step 203, the input image 301 is sent to the registration plate detector 102, which determines the coordinates of the centre of the registration plate 303 by means of known image analysis algorithms. Next, in step 204, colour scale reduction is performed, for example by converting the input image into an image with 256 shades of grey. In step 205 the image is rearranged so that the centre of the registration plate is in the centre of the image, and as a result, an offset image 304 is obtained, as shown in FIG. 3B. In step 206 the offset image 304 is rotated by the rotation angle $\alpha_{norm}$ with respect to the centre of the image, resulting in obtaining a rotated image 305 with the registration plate of the lower border 306 positioned at normalised angle, preferably horizontally, for example as shown in FIG. 3C.

Then, in step 207 scaling of the image based on the attributes defined beforehand is performed, according to formulas:

$$w_{new} = \frac{w_{old}}{s_{norm,w}}$$

$$h_{new} = \frac{h_{old}}{s_{norm,h}}$$

$$s_{norm,w} = z_{norm} + v_{norm} \cdot \left(\frac{y_{plate}}{h_{old}} - 0.5\right)$$

$$s_{norm,h} = s_{norm,w} \cdot a_{norm}$$

where $w_{new}$ describes image width after scaling, $w_{old}$ describes image width before scaling, $h_{new}$ describes image height after scaling, $h_{old}$ describes image height before scaling, and $y_{plate}$ describes coefficient y of point of the centre of the registration plate in the image before scaling (y=0 describes the upper border of the image).

Figure 3D:
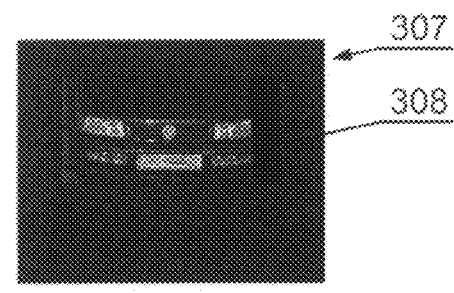

In step 208 within the scaled image 307 the RoI (Region of Interest) area 308 is selected, for parameterisation in parameterisation unit 107, as shown for example in FIG. 3D. The RoI area 308 should be selected so as to include the most relevant, from the classification point of view, features of an image of a front of the vehicle, and to compromise best between options for different vehicle sizes. In the presented algorithm, the RoI area is defined by the normalisation attributes defining area of specified dimensions within the scaled image. Since the scaled image has been obtained by moving the input image 301 depending on the position of the registration plate 303 area, then the position of the RoI area 308 is dependent on the position of the registration plate 303 area.

Figure 3E:
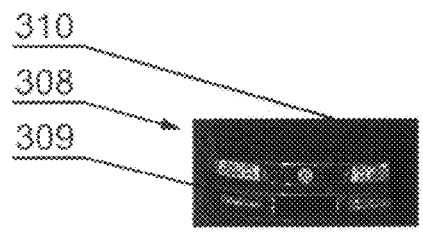

In step 209 the registration plate (of known dimensions resulting from selected image scale attributes and optionally from information about the type of the registration plate, e.g. American/European, from registration plate recognising unit) is masked, and a field 309 comprising the registration plate 303 and a field 310 comprising the area from beyond of the input image 301 are described as undefined data. Therefore information, which could possibly distort classification process, are reduced. For example, undefined data are presented with a shade of value 0, and defined data for classification are presented as shades of value above 0. Exemplary RoI area 308 with fields of undefined data are shown in FIG. 3E.

Figure 3F:

In step 210, a contrast adjustment within the RoI area is additionally performed. For example, for the RoI area 308, a histogram of grey shades is calculated, and based on it an empirical distribution function of grey shades distribution is calculated. From the distribution function the 10. and 90. percentile are determined. Then, the target values of 10. and 90. percentile are calculated, as a weighted average of values calculated from the image and constant target values, set as attributes for calculating the image contrast. Knowing the target values of the 10. and 90. percentile of the empirical distribution function, the target medians of grey shades are determined from a linear interpolation and a change of brightness of individual pixels is performed using a look-up table method. Said correction decreases the influence of the colour of the vehicle on the characteristic vehicle shape features. Such adjusted RoI area, as shown for example in FIG. 3F, is the normalised image 311 suitable for processing in the parameterisation unit 307.

The normalisation procedure shown in FIG. 2 allows consequently to obtain the normalised vehicle images 302, which comprise identical RoI area 308 with respect to the registration plate 303. Thus, they can be compared with a high accuracy with the reference images from the reference database 113, assuring high effectiveness of vehicle characteristics identification.

Figure 4:
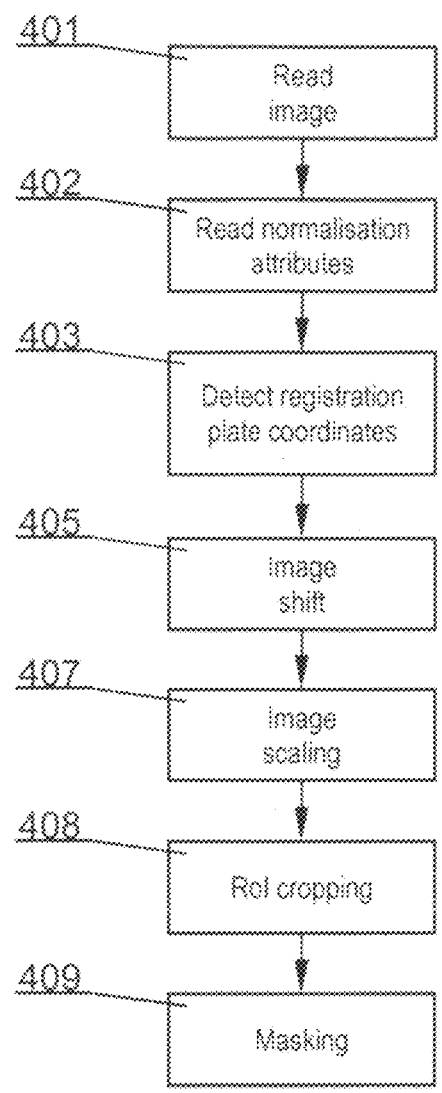
FIG. 4 illustrates an example of normalisation process for determining colour of a vehicle.
Figure 5:
FIG. 5 illustrates exemplary content of an image normalised during normalisation process for determining colour of a vehicle.

FIG. 4 illustrates exemplary normalisation process for determining the colour of a vehicle, performed in the normalisation unit 14, and FIG. 5 illustrates exemplary content of the normalised image. Said process proceeds to a large extent similarly to the normalisation process shown in FIG. 2.

In the first step 401 the input image 301 is read from the image source 101, for example as shown in FIG. 3A. Then, in step 402, normalisation attributes 402 are read, analogously as in step 202.

Due to the simplification of the algorithm for determining a colour with respect to the determining body style, make and model, the number of normalisation attributes can be lower. For example, for determining colour it is not necessary to precisely rotate the image nor to precisely scale with reference to the anisotropy coefficient or perspective scale coefficient. In such case, in the formulas shown in FIG. 2 the rotation angle $\alpha_{norm}$ can be defined as 0, and the values of coefficient $a_{norm}$ and perspective scale coefficient can be equal 1.

In step 403 the coordinates of the registration plate 303 are determined, and then in step 405 the image rearrangement is performed analogously to the step 205. In step 407 the image scaling is performed analogously to the step 207. Additionally, the decimation of the image can be performed, for example with coefficient 4 in both axes, which results in 16-fold reduction of image points number processed in further steps. Such reduction is possible, because colour classification does not require analysis of the image details, but only its colour content. In step 408 the RoI area is selected, coordinates of which should be determined in a manner allowing to expose typical vehicle areas covered by a basic paint colour (for example car bonnet or front fenders) and simultaneously minimise the size of areas causing distortions (e.g. wind-shield, road, area around the registration plate). In step 409 the masking of possible remaining parts of the registration plate and undefined data is performed. Because of the lack of the previous step of colour reduction, undefined data can be presented as the colour, components of which have the value of 0. An example of the image normalised with said method has been illustrated in FIG. 5.

Figure 6:
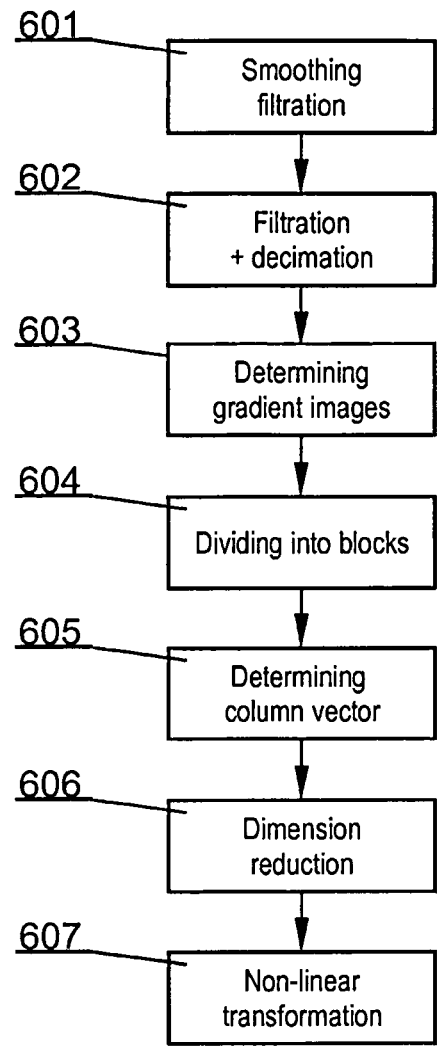
FIG. 6 illustrates an exemplary parameterisation process for determining body style, make and model of a vehicle.
Figure 7A:
FIGS. 7A-7K illustrate exemplary images processed during parameterisation process for determining body style, make and model of a vehicle.
Figure 7B:
Figure 7C:
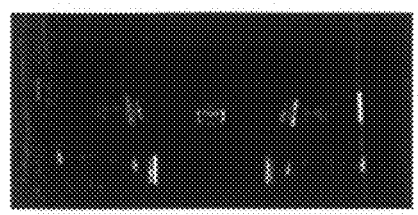
Figure 7G:
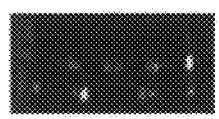
Figure 7D:
Figure 7H:
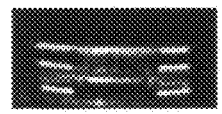
Figure 7E:
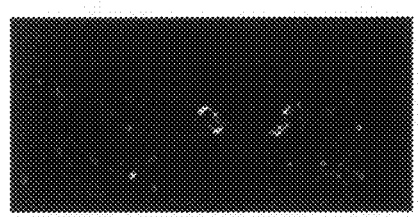
Figure 7I:
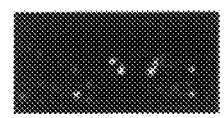
Figure 7F:
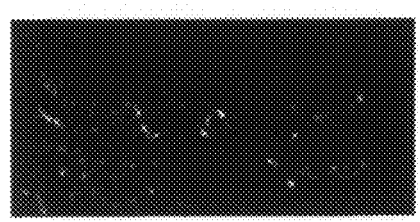
Figure 7J:

FIG. 6 illustrates the parameterisation process of the normalised image for the needs of classification of body style, make and model of a vehicle, performed in the parameterisation unit 107. The exemplary resulting images of the process steps have been shown in FIG. 7A-7K. The normalised image 311 is subjected firstly to Gaussian smoothing filtration in the step 601. An exemplary image $I_0$ after the filtration is shown in FIG. 7A. The aim of the filtration is to reduce high-frequency distortions and minimise aliasing (overlapping of the spectra) related to the decimation process in further steps. $I_0$ image is then subjected again to the Gaussian smoothing filtration in the step 602, and then a decimation in both axes with coefficient 4 is performed, after which a resulting image $I_1$ is obtained. The image $I_1$ is shown in FIG. 7B in fourfold magnification with respect to the image from FIG. 7A. The analysis of images $I_0$, $I_1$ in two scales aims to supply data of different degree of detail to the data discrimination methods used in learning process. Some fragments of vehicle image demonstrate in fact better discrimination features in a coarse scale, whereas others in a fine scale.

In the next step 603 for each image $I_0$ and $I_1$ four images representing oriented gradient of brightness change are determined. The oriented gradient for a given point of image and a set range of directions is obtained by collecting the value of gradient module, if the orientation of the gradient is within the range. Otherwise, the value of 0 is set. In given example, following directions have been used: vertical (V), horizontal (H), right diagonal (DR) and left diagonal (DL). The images representing oriented gradient can be subjected to decimation with a coefficient of 2 in both axes, in order to reduce the number of image points subjected to further processing. FIG. 7C-7F show images $O_{0,V}$, $O_{0,H}$, $O_{0,DR}$, $O_{0,DL}$ of the oriented gradient for image $I_0$ from FIG. 7A, and FIG. 7G-7J show images $O_{1,V}$, $O_{1,H}$, $O_{1,DR}$, $O_{1,DL}$ of the oriented gradient for the image $I_1$ from FIG. 7B.

Figure 7K:
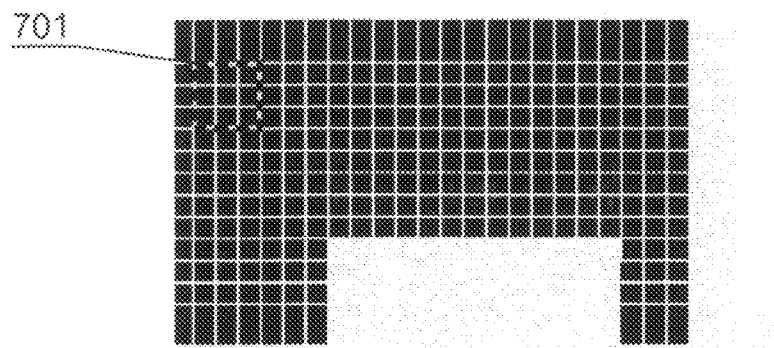

In step 604 the images $O_{i,j}$ are divided into blocks, as shown for example in FIG. 7K, where the undefined data are presented with white colour, the single block being presented with dotted line 701. For images $O_{0,j}$ a different net is used than for images $O_{1,j}$. Blocks, in which at least one pixel has been described as containing undefined data, are not used in the following processing steps. The blocks are being defined as $B_{i,j,n}$, where indexes $i,j$ relate to indexes of the image $O_{i,j}$, and the index n is a block index. The blocks constitute a kind of receptive field, allowing an independent analysis of small fragments of the image, i.e. relating to local features, important in the task of vehicle classification.

In step 605 a column vector $v_{i,n}$ is determined by vectorisation of the data from blocks $B_{i,j,n}$.
Vector $v_{i,n}$ is described as:

$$v_{i,n} = [\nabla(B_{i,0,n}), \ldots, \nabla(B_{i,j,n})]$$

This means that for a given image of index i and for a given block n, values of pixels from all oriented gradients are obtained, and then these values are saved in form of a single vector (matrix) having R dimensions.

Next, in step 606 a dimension reduction is performed by left multiplication by casting matrix $P_{i,n}$ of S×R dimensions, wherein S<<R (much lower), and a column vector $c^{(I)}_{i,n}$ containing S elements and described by following formula is obtained:

$$c^{(I)}_{i,n} = P_{i,n} * v_{i,n}$$

In the next step 607, a nonlinear transformation of each s element of vector $c^{(I)}_{i,n}$ is performed, according to the formula:

$$c^{(nD)}_{i,n,s} = \tan h(a_{i,n,s} \cdot (c^{(I)}_{i,n,s} - b_{i,n,s}))$$

where values of parameters $a_{i,n,s}$ and $b_{i,n,s}$ are determined in a learning process. The aim of the nonlinear transformation is a "soft thresholding" of values of parameters $a_{i,n,s}$ and $b_{i,n,s}$, which ensures a reduction of undesired variability. In other words, from the point of view of the classifier, what matters is the presence or absence of a particular feature, represented by given element $c^{(nD)}_{i,n,s}$. The intensity of occurrence or lack of given feature is from a certain threshold irrelevant for the classifier, and a parameter value variability, related to this intensity, could be harmful for proper classification. The parameters $a_{i,n,s}$ and $b_{i,n,s}$ determine the value of the threshold. For example, a given element $c^{(nD)}_{i,n,s}$ can relate to a certain horizontal line in the gradient image, and the presence of this line is important for the classifier. The presence can also occur with various intensity (brightness in the image). For the classifier, in this case, there is no difference in quality between a line of low brightness and a line of high brightness, thus the value of parameter $c^{(nD)}_{i,n,s}$ should be similar both in case of a bright and a dark line, what is ensured by the use of nonlinear function.

The output of the parameterisation unit 107 is the vector c, the elements of which are constituted by values $c^{(nD)}_{i,n,s}$. If, for certain values indexes i, n, s, the value $c^{(nD)}_{i,n,s}$ is undefined, i.e, the data was undefined in normalised image, based on which this value would be determined, then in vector c in corresponding element an undefined data tag is written.

The classification for determining body style, make and model of a vehicle is performed in the classification unit 111. The vector c of the classified vehicle, obtained during the parameterisation process, is compared with a model vector $c^p$, where $p=0 \ldots P-1$ describes the index of a model, according to the formula:

$$d_p = \frac{\sum_{i \in I} w_i (c_i - c_i^p)^2}{\sum_{i \in I} w_i}$$

where I is a set of elements indexes, for which the data has been specified both in the vector c and $c^p$. The set of models and the weight vector w have been determined in the learning process. The model, for which the lowest value $d_p$ was obtained, is called the closest neighbour of vector c. The models, for which the value of a denominator of the above-mentioned formula is below the threshold given as an internal attribute of classifier, are not taken into account. The body style, make and model of a vehicle are determined based on the model of which vector $c^p$ was determined as the closest neighbour of vector c.

Figure 8:
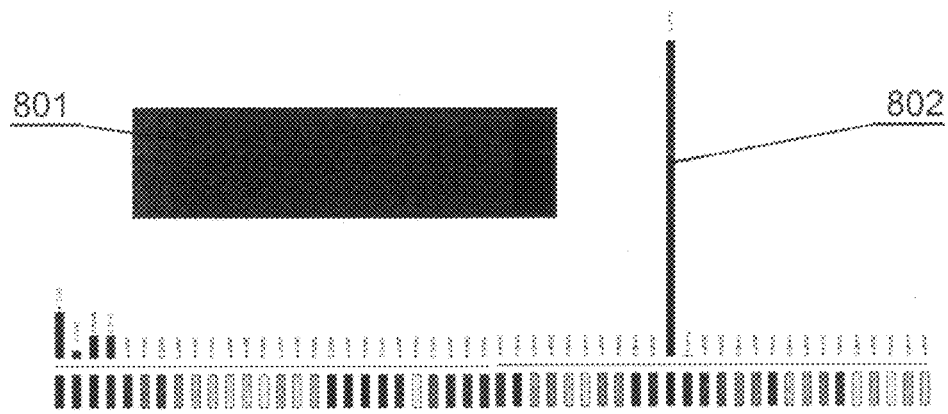
FIG. 8 illustrates a parameterisation process of normalised image for colour classification of a vehicle.

FIG. 8 illustrates the parameterisation process of the normalised image for the needs of vehicle colour classification performed in parameterisation unit 108. In step 801 colour coordinates of all pixels of the normalised image are transformed from an original image space, for example RGB, into CIE 1976 space, known also as Lab or CIELAB. In this space the Euclidean distance between two points, which represent the colours, is close to the distance (difference) perceived by the human. Next, in step 802, for each pixel the closest colour from the previously defined reference colours is found, in a Euclidean metric sense. The reference colour coordinates are the attributes of parameterisation unit. They can be obtained from the reference images, to represent different colours of paints. In step 803 the normalised histograms of occurrence of reference colour assigned to the pixels of normalised image are calculated. These histograms are determined independently for each of rectangular receptive fields, defined in a parameteriser and allocated within the normalised image. For example, these fields can cover the upper and the lower half of the image. FIG. 8 illustrates an exemplary receptive field 801, corresponding to the upper half of the normalised image from FIG. 5, and a colour histogram relating to it, in which a dominating colour 802 can easily be noticed. The values of the histogram obtained in step 804 are subjected to a logarithmic compression, for example according to the formula:

$$h_i^{(nD)} = \ln(1 + 20 \cdot h_i^{(D)})$$

where $h^{(D)}_i$ describes the i-th histogram value before the compression, and the number 20 is a constant selected experimentally. The compression allows to suppress the dynamic within the large values of histogram. The probability distribution of compressed values is closer to a normal distribution than the distribution before compressing. Such calculated histogram values are the output data of parameterisation unit 108. They can also be supplemented by the values of RGB components obtained from averaging the RGB values of all input image pixels, which function as an additional characteristic in the classification process.

The classification for determining colour is performed in the classification unit 112. Each of the recognised colours is assigned a probability distribution (determined in the learning process) of values of parameters obtained in the parameterisation process. This distribution is modelled using the Gaussian Mixture Models (GMM) of diagonal covariance matrixes. The colour classification unit 112 can be a typical, simple ("naive") Bayes classifier, in which an equal probability of colour classes is assumed. A colour, for which the highest probability was obtained in the classifier, is returned as the recognised colour. For histograms, the maximum values of probability distribution are compared. There can be recognised more than one colour in the classification unit 112, for example "grey-silver" or "bright red—dark red", giving the colour stated first as the more probable one. The decision of giving two resulting colours can be made based on the analysis of probability values of two most probable colours, returned by the classification unit 112.

Figure 9:
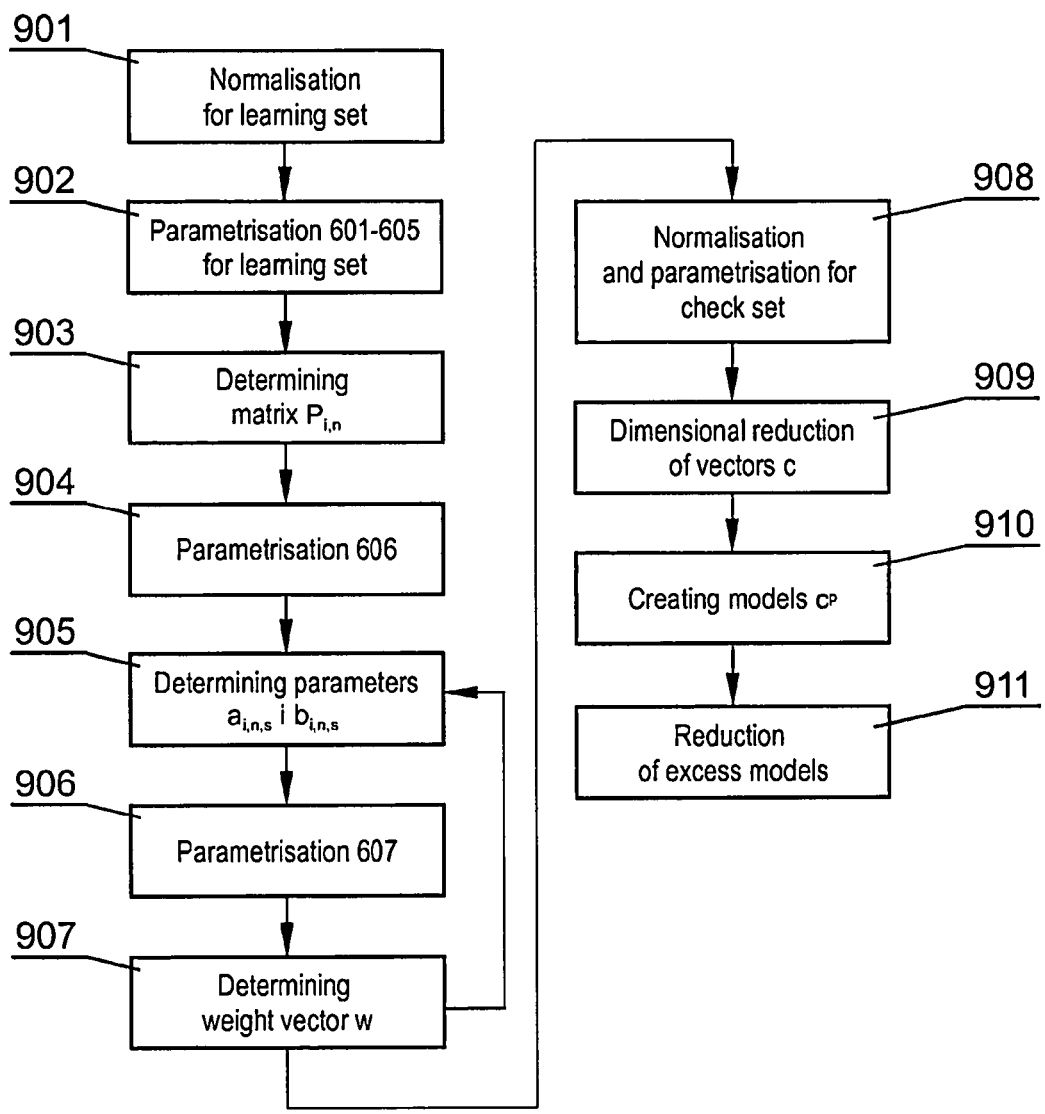
FIG. 9 illustrates a learning process for determining characteristics such as body style, make and model of a vehicle.

FIG. 9 illustrates the learning process for determining characteristics like body style, make or model of a vehicle, controlled in the unit 115. In the first step 901 the normalisation process for vehicles from learning set is performed. Next, in step 902, steps 601-605 of the parameterisation process for vehicles from learning process are performed.

In step 903, the values of the casting matrix $P_{i,n}$ are determined, using Principal Component Analysis (PCA) or the Linear Discriminant Analysis (LDA). The analysis is performed using the set of vectors $v_{i,n}$ obtained in step 605 of parameterisation process.

In step 904, step 606 of parameterisation process is performed using the determined $P_{i,n}$ matrix.

Next, in step 905, values of nonlinear function parameters $a_{i,n,s}$ and $b_{i,n,s}$ are determined. These values are determined independently for each combination of indexes (i, n, s). The optimisation can be performed using a complete search method of set discrete two-dimensional space of parameter values a, b. The aim of the optimisation is to maximise the discriminate value, averaged after all vehicles from learning set:

$$I_j^p = (c_{i,n,s}^{pn(nI)} - c_{i,n,s}^{pnc,(nI)})^2 - (c_{i,n,s}^{pn(nI)} - c_{i,n,s}^{pcn(pI)})^2$$

where p describes the index of given vehicle, pc—the index of the closest vehicle in the vehicle set belonging to the same model (or make, if the model is not defined), and pnc—index of the vehicle closest from beyond of the set of the same model (make). Index j corresponds to the combination of indexes (i, n, s) according to the projection used by constructing vectors c, as described in the last step of parameterisation procedure. The closest vehicles are determined using analogous relationship as for the model index used by the classification. The choice of the closest vehicles is made before the optimisation of the values of parameters $a_{i,n,s}$ and $b_{i,n,s}$ and it is not changed during the optimisation. If step 905 is performed for the first time, the weights $w_i$ are adopted as equal 1 and the set initial values of parameters $a_{i,n,s}$ and $b_{i,n,s}$ are adopted (for example, they may have values of 0.5 or 0.25).

In step 906, step 607 of parameterisation process is performed.

In step 907 the values of weight vector elements are determined so as to maximise discriminate value, averaged after all vehicles from learning set:

$$L_p = \sum_j w_j \cdot \max(0, I_{j,opt}^p), \quad \sum_j w_j^2 = 1$$

where $I_{j,opt}^p$ is the discriminate value obtained in step 905 for optimal values of parameters $a_{i,n,s}$ and $b_{i,n,s}$. The optimal values of weights are determined analytically using Lagrange multipliers method. Steps 905, 907 can be performed iteratively in an alternating way with updating of the values of the parameters $a_{i,n,s}$ and $b_{i,n,s}$ and $w_i$.

In step 908, the normalisation and the parameterisation processes are performed for vehicles from the testing set.

Next, in step 909, dimension reduction of vectors c is performed, by removing from them a certain number of elements, for which the lowest weight values w were obtained, and the elements from certain number of last elements of vectors $c^{(I)}_{i,n}$. According to the formula used in the classification, removal of an element is equivalent to removal of its index from the set of indexes I. The parameters controlling the process of reduction (the number of elements to remove) are determined through optimisation, and the aim is to maximise the quality of classification of vehicles belonging to the testing set.

In the next step 910 the models $c^p$ are created by downloading vectors c of vehicles from the learning part of database. The values of vector c elements are determined for the optimal parameter values obtained in steps 905-909.

In step 911 a reduction of excess models is performed using the algorithm analysing a distance between the models according to the formula used in the classification. Models which are not boundary, i.e. positioned on the edge of the field covered by a given class, and models which are positioned in a distance shorter than a value of set coefficient from another model belonging to given class, are removed. The models are removed one by one until the moment when none of the models meets the criterion of redundancy. Thus, the reduction of the models number by up to 30% is possible, with marginal loss of classification quality.

The learning process for classification of vehicle colour in step 116 comprises determining the probability distribution of parameter values obtained in the parameterisation process for each of the colours recognised by the system. The values of parameters of the GMM model are estimated from the sample obtained from the vehicles belonging to subsets of colour database. The Expectation-Maximisation (EM) estimation method is used. In GMM model 1 to 5 normal components can be used, though the bigger the sample of vehicles representing given colour, the more components used in its modelling.

The method and system presented above may be implemented by means of a computer system, comprising one or more computers connected directly or via a computer network and comprising computer programs for carrying out the presented method. Moreover, some or all of the tasks of the presented method and system can be implemented by means of dedicated electronic circuits, implementing the presented functionality.

The invention claimed is:

1. A computer implemented method for vehicle type identification to determine at least one vehicle characteristic, the method comprising:
   obtaining an input image of the vehicle from an image source connected to a motion sensor and configured to be triggered the motion sensor;
   converting the input image of the vehicle by a processor of a normalization unit to a normalized image by:
      reading normalization attributes ($z_{norm}$, $a_{norm}$, $v_{norm}$) from a unit for calibration of normalization attributes;
      detecting a registration plate area within the input image processing the input image basing on normalization attributes defining at least one scaling coefficient ($z_{norm}$, $a_{norm}$, $v_{norm}$);
      choosing from the sealed image a RoI area of a normalized size and location dependent on the location of the registration plate area; and, presenting data from the RoI area as a normalized image;
   performing by a processor of a parameterization unit a smoothing filtration of the normalized image to obtain a smoothed image ($I_i$);
   determining oriented gradient images ($O_{i,j}$) of brightness change for the smoothed image (h) in different directions (j);
   dividing the oriented gradient images ($O_{i,j}$) into blocks ($B_{i,j,n}$);
   determining a column vector ($v_{i,n}$) having R dimensions and defined as $$v_{i,n}=[\nabla(B_{i,0,n}),\ldots,\nabla(B_{i,j,n})]$$

reducing dimension of the column vector ($v_{i,n}$) by left multiplication by a casting matrix $P_{i,n}$ having S dimensions, wherein S is lower than R to obtain a column vector $c^{(I)}_{i,n}$ defined as:

$$c^{(I)}_{i,n}=P_{i,n}*v_{i,n}$$

providing the column vector c as the output of the parameterisation unit describing parameters of the normalized image;
   and determining the vehicle characteristic by a processor of a classification unit by comparing the parameters of a normalized image with parameters of reference images obtained from a reference database.

2. The method according to claim 1, wherein for a specific input image scene the following steps are performed:
   obtaining a set of reference images;
   selecting values of normalization attributes defining at least one scale coefficient ($z_{norm}$, $a_{norm}$, $v_{norm}$) in a manner allowing to obtain the scaled image with the registration plate of the normalized size ($w_{plate}$, $h_{plate}$) as a result of processing during normalization, for most of the reference images;
   setting said selected values of normalization attributes ($z_{norm}$, $a_{norm}$, $v_{norm}$) to perform normalization of subsequent input images obtained in given scene.

3. The method according to claim 2, further comprising selecting a value of a normalization attribute determining angular rotation of image ($\alpha_{norm}$), in a manner allowing to obtain a rotated image with a registration plate of a lower border positioned at a normalized angle as a result of processing during normalization, for most of the reference images.

4. The method according to claim 1, wherein processing of input image during the normalization results in color reduction of input image.

5. The method according to claim 1, wherein processing of input image during the normalization results in decimation of input image.

6. The method according to claim 1, further comprising performing contrast adjustment within the RoI area, presented as the normalized image.

7. The method according to claim 1, further comprising decimating the smoothed image (I0) to obtain a second smoothed image (I1) of a reduced scale and subjecting the first and second images (I0, I1) to further parameterization independently.

8. The method according to claim 1, wherein:
   within the RoI area, presented as the normalized image, the field comprising the registration plate and/or the field comprising the area from beyond input image are presented as undefined data
   blocks ($B_{i,j,n}$) of the oriented gradient images ($O_{i,j}$) in which at least one pixel has been described as containing undefined data are excluded from analysis (605-607) in the normalization process.

9. The method according to claim 1, further comprising subjecting each element(s) of the column vector $c^{(I)}_{i,n}$ to non-linear transformation to obtain a transformed column vector comprising elements $c^{(nI)}_{i,n,s}$ according to a formula:

$$c_{i,n,s}^{(nI)}=\tan h(a_{i,n,s}\cdot(c_{i,n,s}^{(I)}-b_{i,n,s}))$$

wherein values of parameters $a_{i,n,s}$ and $n_{i,n,s}$ are determined in a learning process and providing the transformed vector c comprising elements $c^{(nI)}_{i,n,s}$ as the output of the parameterisation unit describing parameters of the normalized image.

10. A system for vehicle type identification to determine at least one vehicle characteristic, the system comprising:

an image source providing an input image of the vehicle, the image source being connected to a motion sensor and configured to capture an image when the image source is triggered by the motion sensor;

a normalization unit having a processor configured to normalize of the input image of the vehicle to obtain a normalized image by:

reading normalization attributes ($z_{norm}$, $a_{norm}$, $v_{norm}$) from a unit for calibration of normalization attributes;

detecting a registration plate area within the input image processing the input image basing on normalization attributes defining at least one scaling coefficient ($z_{norm}$, $a_{norm}$, $v_{norm}$);

choosing from the scaled image a RoI area of a normalized size and location dependent on the location of the registration plate area;

and presenting data from the RoI area as a normalized image:

and a classification unit having processor configured to determine the vehicle characteristic by comparing parameters of a normalized image obtained by a processor of a parameterization unit with parameters of reference images obtained from a reference database;

wherein the processor of the parameterization unit is further configured to:

perform a smoothing filtration of the normalized image to obtain a smoothed image (Ii);

determine oriented gradient images (Oi,j) of brightness change for the smoothed image (Ii) in different directions (i);

divide the oriented gradient images (Oi,j) into blocks (Bi,j,n);

determine a column vector ($v_{i,n}$) having R dimensions and defined as $$v_{i,n} = [\nabla(B_{i,0,n}), \ldots, \nabla(B_{i,j,n})]$$

reduce dimension of the column vector (vin) by left multiplication by a casting matrix $P_{i,n}$, having S dimensions, wherein S is lower than R to obtain a column vector $c^{(I)}_{i,n}$ defined as $$c^{(I)}_{i,n} = P_{i,n} * v_{i,n}$$

provide the column vector c as the output describing parameters of the normalized image.

* * * * *